United States Patent
Wolber et al.

(10) Patent No.: US 7,634,550 B2
(45) Date of Patent: Dec. 15, 2009

(54) MESSAGE-ORIENTED MIDDLEWARE PROVIDER HAVING MULTIPLE SERVER INSTANCES

(75) Inventors: Andreas Wolber, Heidelberg (DE); Bernd Follmeg, Weinheim (DE)

(73) Assignee: SAP AG, Walldorf (DE)

( * ) Notice: Subject to any disclaimer, the term of this patent is extended or adjusted under 35 U.S.C. 154(b) by 1161 days.

(21) Appl. No.: 10/829,875

(22) Filed: Apr. 21, 2004

(65) Prior Publication Data

US 2005/0240663 A1    Oct. 27, 2005

(51) Int. Cl.
*G06F 15/16* (2006.01)
*G06F 15/173* (2006.01)
*G06F 15/177* (2006.01)

(52) U.S. Cl. ............... 709/220; 709/203; 709/227; 719/316

(58) Field of Classification Search ......... 709/217–228, 709/203; 719/316
See application file for complete search history.

(56) References Cited

U.S. PATENT DOCUMENTS

| | | | |
|---|---|---|---|
| 6,877,107 B2* | 4/2005 | Giotta et al. | 714/4 |
| 2003/0105800 A1* | 6/2003 | Cullen | 709/201 |
| 2004/0028212 A1* | 2/2004 | Lok et al. | 379/265.09 |
| 2005/0044197 A1* | 2/2005 | Lai | 709/223 |

* cited by examiner

*Primary Examiner*—Haresh N Patel
(74) *Attorney, Agent, or Firm*—Blakely, Sokoloff, Taylor & Zafman, LLP

(57) ABSTRACT

A method, apparatus, and system are provided for a Message-Oriented Middleware (MOM) provider having multiple logical MOM server instances. In an embodiment, the MOM provider having multiple logical MOM server instances is implemented on an application server. Each MOM server instance may include a session container to manage one or more sessions and a destination container to provide one or more destinations. In an embodiment, a globally unique identifier identifies each destination.

14 Claims, 12 Drawing Sheets

MESSAGE-ORIENTED MIDDLEWARE PROVIDER HAVING MULTIPLE SERVER INSTANCES

TECHNICAL FIELD

Embodiments of the invention generally relate to the field of Message-Oriented Middleware (MOM) and more particularly, to a MOM provider having multiple MOM server instances.

BACKGROUND

Traditional client-server systems employ a two-tiered architecture such as that illustrated in FIG. 1. Applications 102 executed on the client side 100 of the two-tiered architecture are comprised of a monolithic set of program code including a graphical user interface component, presentation logic, business logic and a network interface that enables client 100 to communicate over network 103 with one or more servers 101. A database 104 maintained on server 101 provides non-volatile storage for the data accessed and/or processed by application 102.

As is known in the art, the "business logic" component of the application represents the core of the application, for example, the rules governing the underlying business process (or other functionality) provided by the application. The "presentation logic" describes the specific manner in which the results of the business logic are formatted for display on the user interface. The "database" 104 includes data access logic used by the business logic to store and retrieve data.

The limitations of the two-tiered architecture illustrated in FIG. 1 become apparent when employed within a large enterprise. For example, installing and maintaining up-to-date client-side applications on a large number of different clients is a difficult task, even with the assistance of automated administration tools. Moreover, a tight coupling of business logic, presentation logic and the user interface logic makes the client-side code very brittle. Changing the client-side user interface of such applications is extremely hard without breaking the business logic, and vice versa. This problem is aggravated by the fact that, in a dynamic enterprise environment, the business logic may be changed frequently in response to changing business rules. Accordingly, the two-tiered architecture is an inefficient solution for enterprise systems.

In response to limitations associated with the two-tiered client-server architecture, a multi-tiered architecture has been developed, as illustrated in FIG. 2. In the multi-tiered system, presentation logic 221, business logic 222 and database 223 are logically separated from the user interface 220. These layers are moved off of client 225 to one or more dedicated servers on network 203. For example, presentation logic 221, business logic 222, and database 223 may each be maintained on separate servers, 226, 227 and 228, respectively.

This separation of logic components and the user interface provides a more flexible and scalable architecture compared to that provided by the two-tier model. For example, the separation ensures that all clients 225 share a single implementation of business logic 222. If business rules change, changing the current implementation of business logic 222 to a new version may not require updating any client-side program code. In addition, presentation logic 221 may be provided which generates code for a variety of different user interfaces 220, which may be standard browsers such as Internet Explorer® or Netscape Navigator®.

Although the multi-tiered system illustrated in FIG. 2 provides a more flexible architecture, it also results in significant additional complexity. For example, the distributed nature of applications and components within the multi-tiered system makes it more complicated for the applications and components to communicate with each other. A class of middleware known as Message-Oriented Middleware may be used to facilitate communication between applications and components.

Message-Oriented Middleware (MOM) refers to computer software that provides a message service between software components or applications. The message service provided by MOM is often referred to as "loosely coupled" because a component sends a message to a destination and the recipient can retrieve the message from the destination. A message service typically includes a message provider and one or more clients. The message provider facilitates, for example, creating, sending, receiving, and reading messages. A client uses the message provider to, for example, send a message to a destination and another client may use the message provider to retrieve the message from the destination.

Although the message service facilitates communication between distributed software components and applications, it also reduces some of the flexibility of the multi-tiered architecture. For example, the scalability of the multi-tiered architecture may be constrained by the capacity of a central message provider. Also, a central message provider requires a relatively brittle namespace scheme to ensure that messages are properly delivered.

SUMMARY OF THE INVENTION

A method, apparatus, and system are provided for a Message-Oriented Middleware (MOM) provider having multiple logical MOM server instances. In an embodiment, the MOM provider having multiple logical MOM server instances is implemented on an application server. Each MOM server instance may include a session container to manage one or more sessions and a destination container to provide one or more destinations. In an embodiment, each destination is identified by a globally unique identifier.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

A method, apparatus, and system are provided for a Message-Oriented Middleware (MOM) provider having multiple logical MOM server instances. In an embodiment, the MOM provider having multiple logical MOM server instances is implemented on an application server. Each MOM server instance may include a session container to manage one or more sessions and a destination container to provide one or more destinations. In an embodiment, a globally unique identifier identifies each destination. As is further described below, in an embodiment, each of the multiple logical MOM server instances is defined by a configuration entity.

Figure 1:
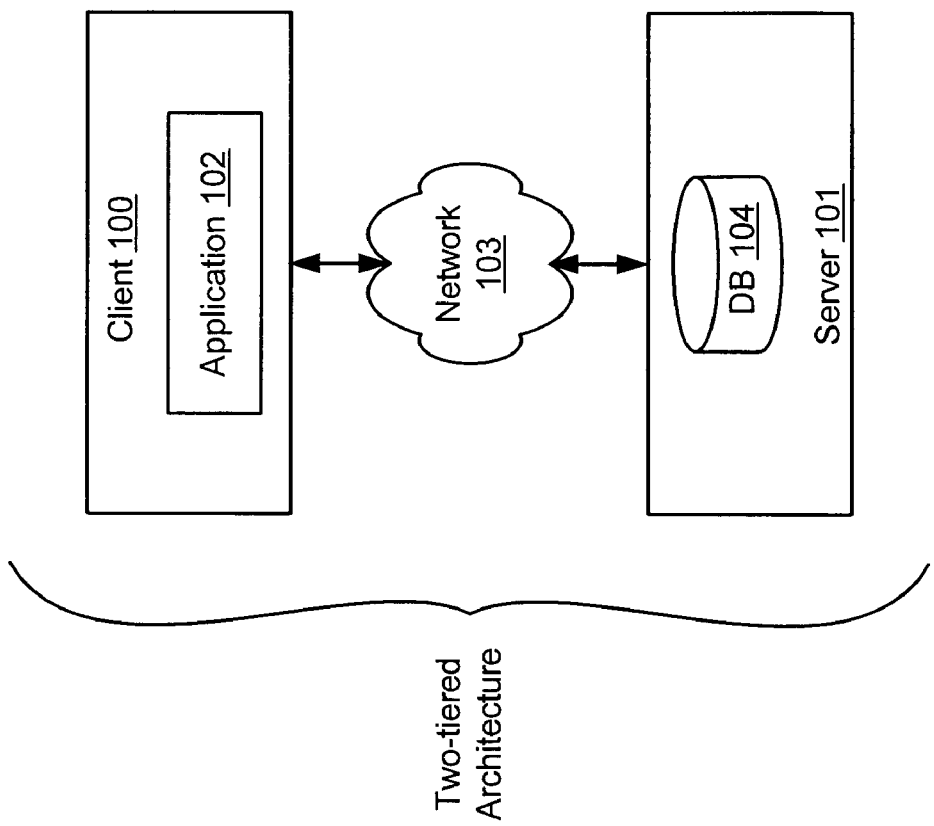
FIG. 1 illustrates a traditional two-tier client-server architecture.
Figure 2:
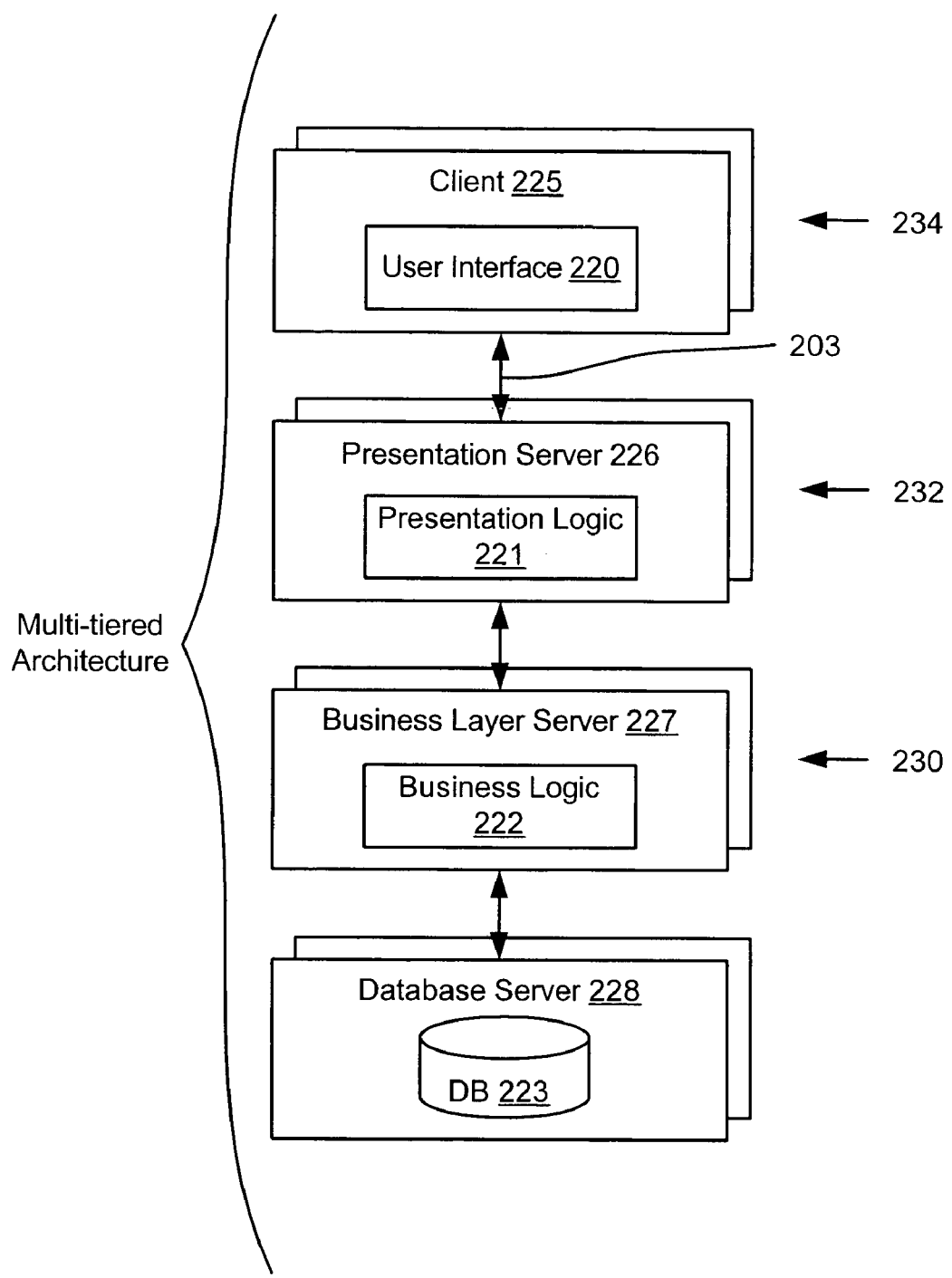
FIG. 2 illustrates a prior art multi-tier client-server architecture.
Figure 3:
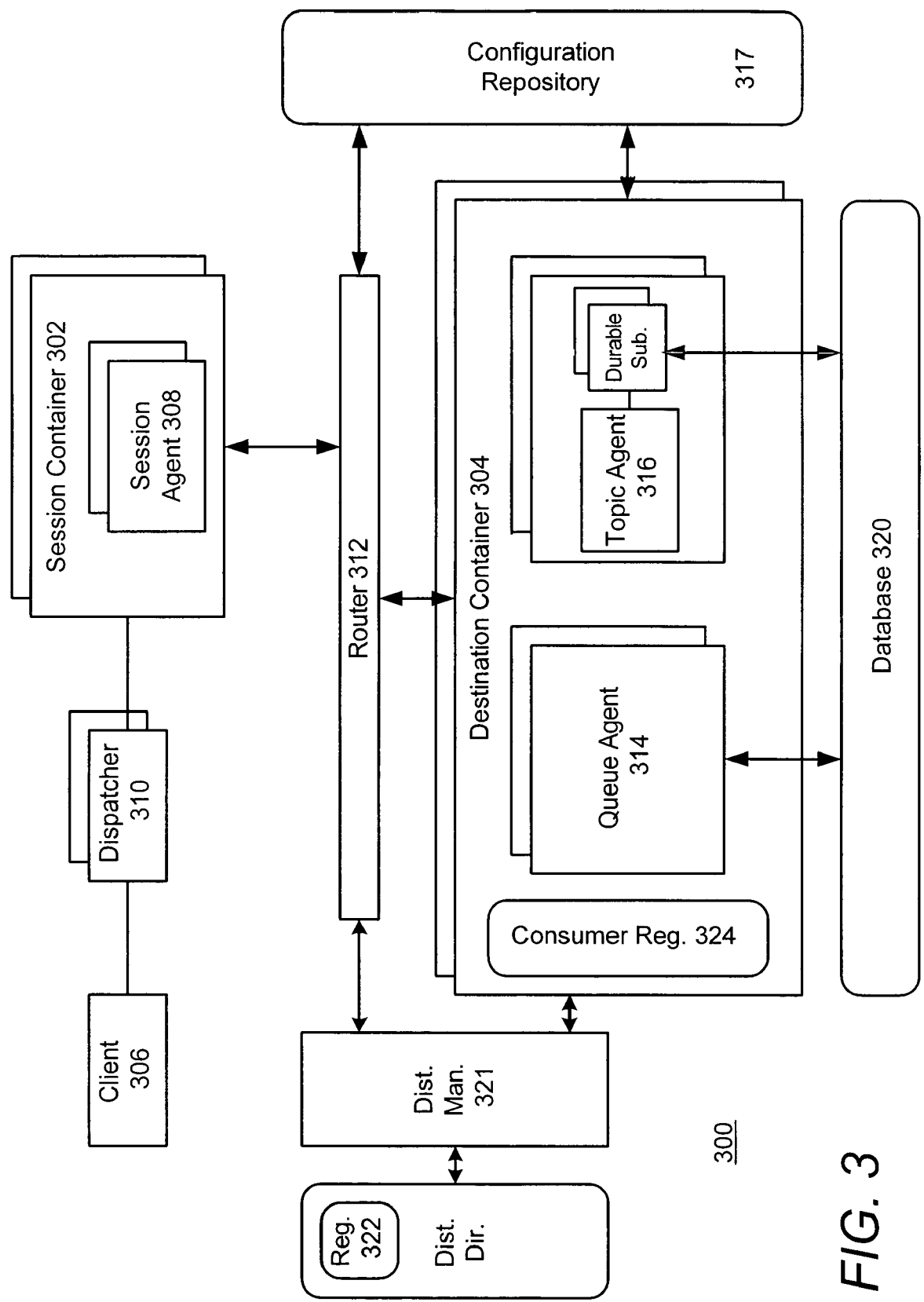
FIG. 3 is a block diagram of a Message-Oriented Middleware (MOM) provider implemented according to an embodiment of the invention.

FIG. 3 is a block diagram of MOM provider 300 implemented according to an embodiment of the invention. As is further discussed below, MOM provider 300 may be integrated into a multi-tiered network (e.g., the multi-tiered network illustrated in FIG. 2). The multi-tiered network may be implemented using a variety of different application technologies at each of the layers of the multi-tier architecture, including those based on the Java 2 Enterprise Edition™ ("J2EE") platform, the Microsoft NET platform, the Websphere platform developed by IBM Corporation, and/or the Advanced Business Application Programming ("ABAP") platform developed by SAP AG.

In an embodiment, MOM provider 300 is implemented on an application server. The term "application server" broadly refers to a computing device that performs data processing. In a multi-tiered environment, such as the one illustrated in FIG. 2, application servers may provide the business logic for the distributed system. In an embodiment in which the business logic (e.g., business logic 222, shown in FIG. 2) exchanges information with a user interface (e.g., user interface 220, shown in FIG. 2) via the Internet, the application servers providing the business logic may be described as Web application servers.

In an embodiment, MOM provider 300 is separated into two main layers: session container 302 and destination container 304. Session container 302 is responsible for session and connection related tasks. The term "session" refers to an active connection between two elements of a distributed system (e.g., between two applications, between two components, between an application and a component, etc.). The term "connection" refers to a connection between an MOM client and the MOM provider.

In an embodiment, when a client creates an MOM connection (e.g., via a directory lookup) the connection is bound to a session container (e.g., session container 302). All sessions created on the connection may also be bound to the session container. In an embodiment, session container 302 may manage the connections and sessions of multiple clients (e.g., client 306). Establishing a connection is further discussed below with reference to FIG. 8-9.

In one embodiment, session container 302 includes a logical session agent 308 for each session it is managing. Session agent 308 may process (and/or preprocess) all requests for an MOM session using one or more logical handlers. The term "handler" refers to a software routine that performs a particular task. Examples of handlers provided by session agent 308 may include, and are not limited to, security management, logging, monitoring, transaction management, etc.

In operation, client 306 may send an MOM message to dispatcher 310 to be distributed to a destination. Session container 302 may accept the message and forward it to session agent 308. Session agent 308 may process the message and send it to router 312. Router 312 may be a logical component that transmits messages between session container 302 and destination container 304. Router 312 may include router code and/or may use the internal communication system of the application server.

Destination container 304 is responsible for executing the core messaging functions of storing messages (e.g., in volatile memory and/or persistently), maintaining the order of messages, and distributing the messages to the proper recipients. In one embodiment, destination container 304 includes all of the destination agents (e.g., queue agent 314 and topic agent 316) that are bound to the application server on which destination container 304 is implemented. The term "destination agent" refers to a software agent that is responsible for handling the messaging operations of a particular destination. In an embodiment, the destination agents are maintained in volatile memory as data structures for all destinations that are "active." The term "active" may refer to a destination that has at least one consumer or producer attached.

MOM provider 300 may support one (or both) of the messaging schemes known as point-to-point and publish/subscribe messaging. In point-to-point messaging, each message is addressed to a specific queue. The term "queue" refers to a storage space either in memory or a persistent store (e.g., a database) for messages that are addressed to a particular client. A client establishes the queue to hold its messages. The queue may retain all messages sent to it until the messages are consumed or until they are expired.

In a publish/subscribe messaging scheme a client addresses a message to a topic. The term "topic" refers to a storage space either in memory or a persistent store (e.g., a database) for messages that may be accessed by clients that subscribe to the topic. The topic may retain messages for as long as it takes to distribute the messages to all clients.

In an embodiment, queue agent 314 handles all messages for a particular queue (e.g., a queue in database 320 and/or in volatile memory). In one embodiment, queue agent 314 manages the order of messages within an associated queue. In such an embodiment, a separate queue agent 314 exists for each queue managed by destination container 304.

In an embodiment, topic agent 316 handles all messages sent to an associated topic. In such an embodiment, topic agent 316 includes logic to maintain the associated topic in volatile memory. In addition, topic agent 316 may include memory swapping logic to swap data between volatile memory and, for example, database 320. In an alternative embodiment, topic agent 316 includes logic to maintain the associated topic on database 320 (in addition to or instead of maintaining the topic in volatile memory).

In one embodiment, distribution manager 321 creates agents, as needed, for MOM provider 300 and its logical MOM server instances. For example, distribution manager 321 may create session agent 308, queue agent 314, and/or topic agent 316, as needed. In an alternative embodiment, destination agents (e.g., queue agent 314 and/or topic agent 316) are created by an appropriate AgentHandler for each destination that becomes active. In addition, session contexts may implement the functionality of session agents 308. A SessionHandler for each client session may create a session context and the session context may be stored in the corresponding connection context.

In an embodiment, router 312 and distribution manager 321 make use of one or more directories and repositories that store information for MOM provider 300. In an embodiment, destination registry 322 stores the physical location of the agents (e.g., queue agent 314 and/or topic agent 316) responsible for each destination. In an alternative embodiment (e.g., in which destination registry 322 is not implemented), destinations and related objects (e.g., queue agent 314 and/or topic agent 316) that belong to a given logical MOM server instance (e.g., logical MOM server instance 420, shown in FIG. 4) are hosted on the "parent" server node (e.g., application server 400, shown in FIG. 4). In an embodiment, consumer registry 324 maintains a list of consumers for each destination in destination container 304. As is further described below, with reference to FIG. 6, configuration repository 317 may store configuration information for MOM entities such as MOM server instances, queues, topics, durable subscriptions, and the like.

Database 320 may persistently store messages for queues and/or durable subscriptions. The term "durable subscription" refers to receiving messages at a topic for a client that is not active (e.g., not currently connected to the topic). In addition, database 320 may store data that is "swapped" in and out of volatile memory to conserve system resources. In an embodiment, database 320 includes a Database Management System (DBMS). The term "DBMS" refers to logic that provides overall organization of the data within a database. For example, a DBMS may retrieve the data from the database and/or ensure integrity of the data within the database. In an embodiment, the DBMS may be a "relational" DBMS (or simply, RDBMS).

Figure 4:
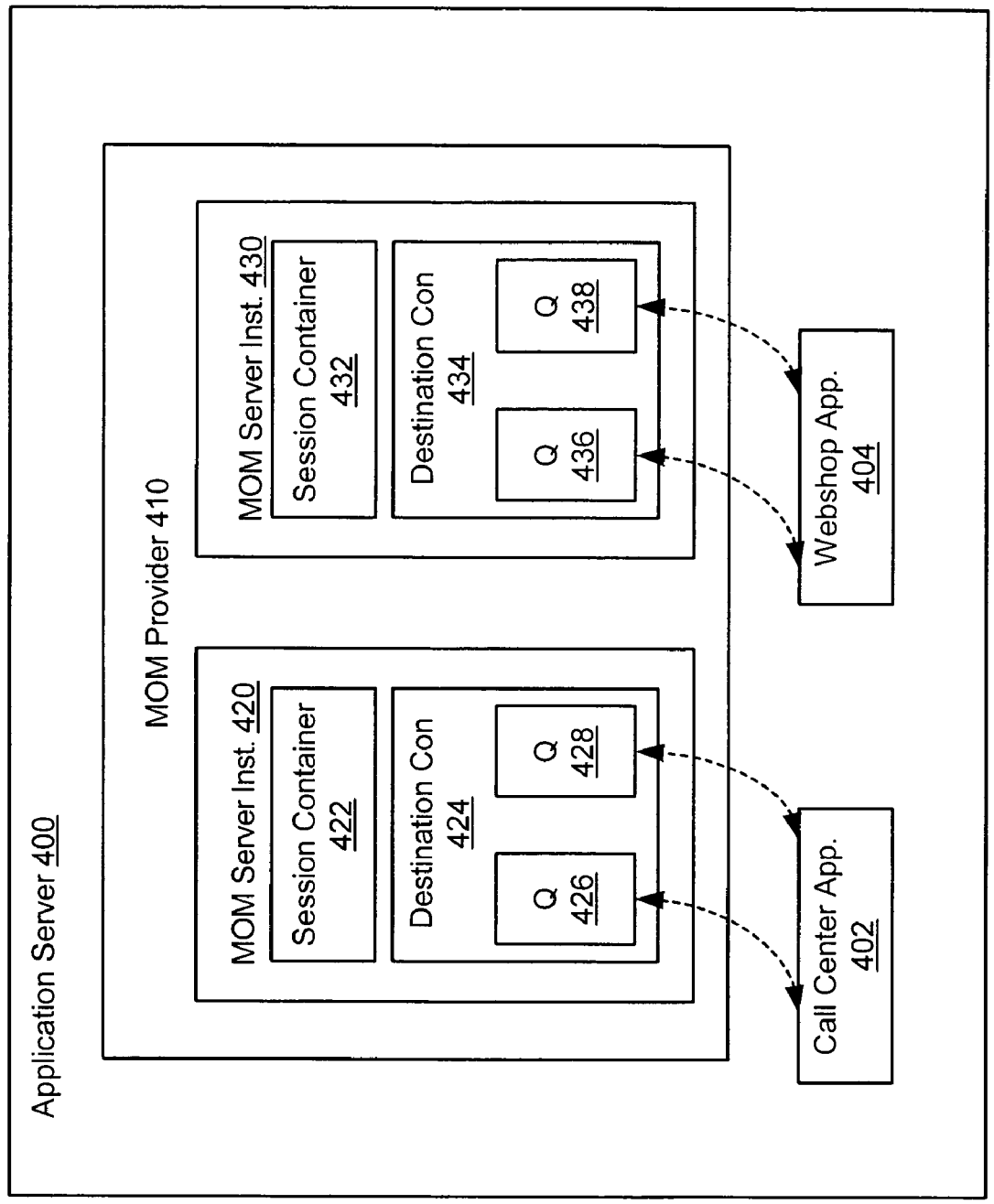
FIG. 4 is a block diagram of selected elements of an application server implemented according to an embodiment of the invention.

FIG. 4 is a block diagram of selected elements of application server 400 implemented according to an embodiment of the invention. In the illustrated embodiment, applications 402 and 404 are deployed to application server 400. Application 402 may be, for example, a call center application and application 404 may be a "Webshop" application. The term "Webshop" refers to buying and selling goods over the Internet.

MOM provider 410 provides a message service for applications and components executing on application server 400. In the illustrated embodiment, MOM provider 410 includes logical MOM server instances 420 and 430. Logical MOM server instances 420 and 430 may be defined by separate configuration entities that specify, for example, identifiers for the logical instances, identifiers for the destinations, which destinations are assigned to which logical instance, and the like. These configuration entities are further described below with reference to FIGS. 5-9. For purposes of explanation, an embodiment of the invention having two logical MOM server instances is described. It is to be understood however, that only one server instance or more than two server instances may configured.

Initially, only one of applications 402 and 404 may be deployed on application server 400 and only one logical MOM server instance is configured. For example, call center application 402 may be deployed and logical MOM server instance 420 may be configured to provide a message service for call center application 402. In such an embodiment, the configuration options of MOM server instance 420 may be optimized for call center application 402. For example, session container 422 may be configured to provide one or more message sessions for application 402. Also, destination container 424 may be configured to provide queues 426 and 428 for application 402.

A potential challenge occurs, however, when Webshop application 404 is deployed to application server 400. It is possible that Webshop application 404 uses a queue that has the same name as one of the queues used by application 402. For example, call center application 402 may have two queues: QIncomingCalls 426 and QOrders 428. Similarly, Webshop application 404 may have the following two queues: NewUserRequest 436 and QOrders 438.

Logical MOM server instance 430 may be configured to separate the namespaces of the queues used by applications 402 and 404. For example, session container 432 may be configured to provide one or more message sessions for application 404. Destination container 434 may be configured to provide NewUserRequest queue 436 and QOrders queue 438. Since a separate logical MOM server instance is providing a message service for application 404, there is no conflict in the namespaces used by the queues of application 404 and the queues of application 402. In addition it is easier to administer and optimize MOM server instance 430 because it providers an MOM service to a specific application.

In one embodiment, application server 400 is a Java 2 Enterprise Edition (J2EE) application server. The term J2EE application server broadly refers to an application server that implements, at least in part, one of the J2EE specifications, for example, v1.3, published on Jul. 27, 2001 (hereinafter the J2EE Standard). Examples of a J2EE application server may include, for example, the Web Application Server (Web AS) provided by SAP AG and the Websphere application server by IBM Corporation. In an alternative embodiment, application server 400 is implemented according to a different platform, for example, the Microsoft.NET platform.

In an embodiment, logical MOM server instances 420 and 430 are Java Message Service (JMS) based MOM server instances. A JMS-based server instance broadly refers to an MOM server instance that implements, at least in part, the JMS Application Program Interface (API). In an alternative embodiment, logical MOM server instances 420 and 430 may be based on a different messaging API.

Figure 5:
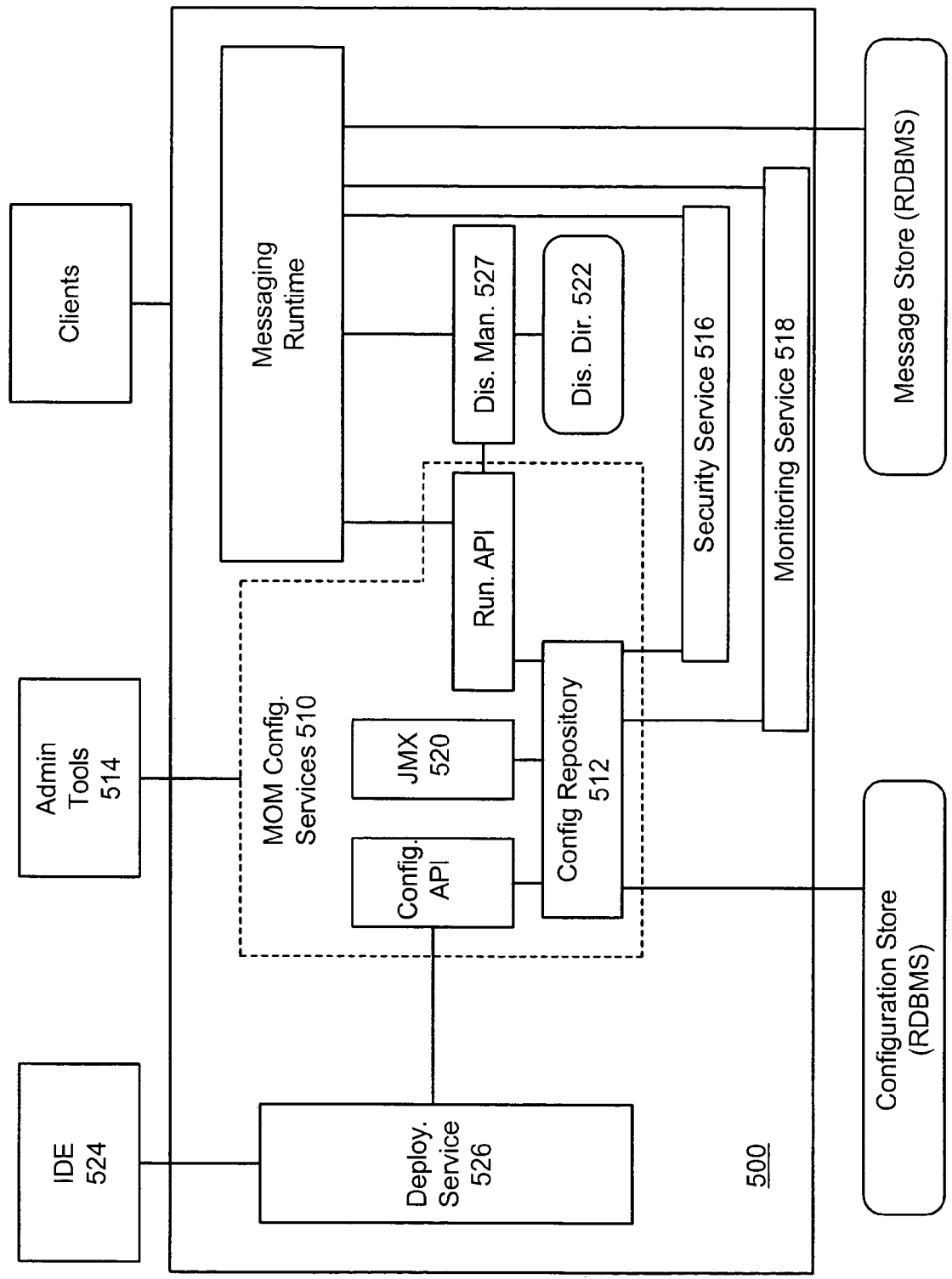
FIG. 5 is a block diagram of selected elements of the "configuration facilities" for an MOM provider, according to an embodiment of the invention.

In an embodiment, a logical MOM server instance (e.g., logical MOM server instance 420, shown in FIG. 4) may be specified by a configuration entity having one or more items of configuration information. The configuration information established for each MOM server instance may be used to distribute and process messages (e.g., the configuration information may be used to identify a "name" of a server instance). FIG. 5 is a block diagram of selected elements of configuration facilities 500 for an MOM provider, according to an embodiment of the invention.

MOM configuration services 510 may provide access to configuration information for a deploy service (e.g., deploy service 526) and/or an administrative tool (e.g., administrative tool 514). Integrated development environment (IDE) 524 may use deploy service 526 to define the settings (e.g., define configuration information) for one or more logical MOM server instances during the deployment of application code. For example, in some cases it is desirable to configure one or more logical MOM server instances in conjunction with deploying application code. In an embodiment, one or more configuration settings of an MOM server instance may be specified in IDE 524 (e.g., in an eXtensible Markup Language file) and deployed with the application code. In an embodiment, deploy service 526 may be an implementation, at least in part, of the J2EE deploy service.

In an embodiment, administrative tool 514 accesses configuration services 510 to inspect and modify configuration information. Administrative tool 514 may include a graphical user interface (GUI) and/or may be a shell console (e.g., command line driven interface). In an embodiment, administrative tool 514 is a Web-based administrative tool. In an embodiment, in which administrative tool 514 provides a GUI, the GUI may be a swing-based GUI. A Swing-based GUI refers to a GUI that is based on the Swing API provided by, for example, the Java 2 Platform, Standard Edition, Specification, 1.4.2, Nov. 20, 2003.

MOM configuration services 510 includes configuration repository 512. Configuration repository 512 may store configuration information for MOM entities such as MOM server instances, queues, topics, durable subscriptions, and the like. Configuration information for these entities is further described below with reference to FIGS. 6-7. In an embodiment, MOM configuration services 510 may provide the information stored in repository 512 to, for example, distribution manager 527, security service 516, and/or monitoring service 518. In an embodiment, monitoring service 518 is, at least partly, based on the Java Management eXtensions (JMX) standard. The term "JMX standard" may refer to, for example, JSR-000003, entitled, "Java Management eXtensions (JMX), version 1.2." In such an embodiment, JMX bridge 520 may provide access to one or more manageable resources (e.g., configuration information) stored in configuration repository 512.

In an embodiment, distribution manager 527 distributes handlers for MOM destinations (e.g., queues 426, 428, 436, and 438, shown in FIG. 4) that are implemented on an application server (e.g., application server 400, shown in FIG. 4). In addition, distribution manager 527 may create new instances of handlers and/or monitor the operational state of handlers. In an embodiment, distribution manager 527 stores information about handlers, sessions, destinations, and/or agents in distribution directory 522.

In one embodiment, distribution directory 522 stores the runtime-dependent location of the various agents that are used by the logical MOM server instances that are implemented on an application server. To provide timely access, the information of distribution directory 522 may be stored in the volatile memory of the application server.

In an embodiment, an MOM provider having multiple MOM server instances is, at least partly, integrated with a JMS-based API. For ease of discussion, an embodiment of the invention that is integrated with a JMS-based API is described with reference to FIGS. 6a and 6b. In such an embodiment, the MOM provider and MOM server instances may be, respectively, referred to as the JMS provider and the JMS server instances. It is to be understood, however, that the concept of an MOM provider having multiple MOM server instances is not limited to embodiments that are integrated with the JMS API.

The JMS-based API defines pre-configured objects known as "administered objects" which implement some of the functions of a JMS-based message service. The administered objects include "connection factories" and "destinations." A "connection factory" is a pre-configured JMS object that a client uses to create a connection with a JMS provider. A "destination" is an object that a client uses to specify as the target for the messages it produces and/or the source of the messages it consumes. These administered objects may be stored in the Java Naming Directory Interface (JNDI) API namespace of a node or as a persistent representation of the respective objects in any kind of storage medium, e.g. in a database system, file system or in any other kind of directory system.

Figure 6A:
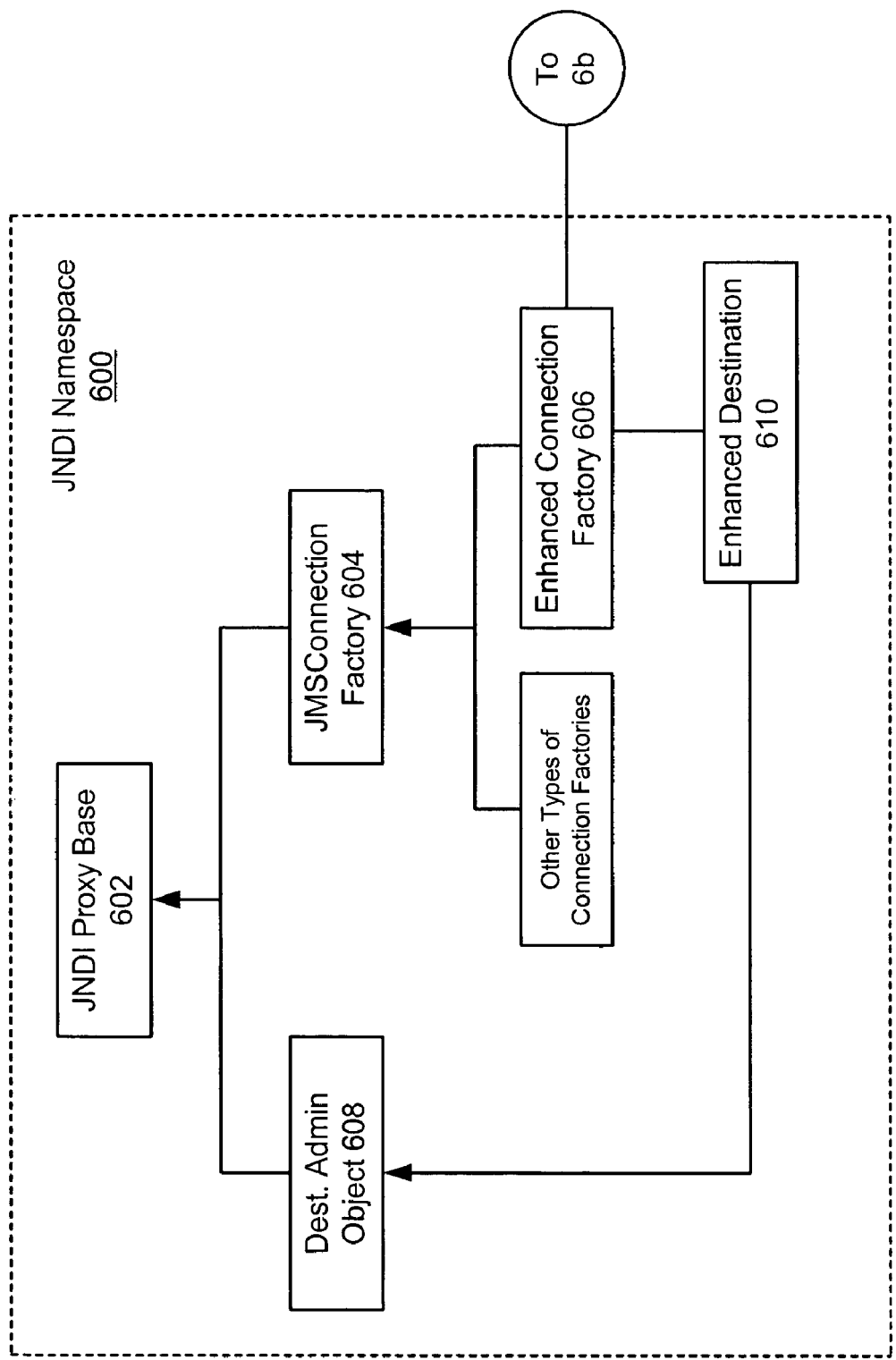
FIG. 6a is a conceptual illustration of the administered objects stored in a registry service, according to an embodiment of the invention.
Figure 6B:
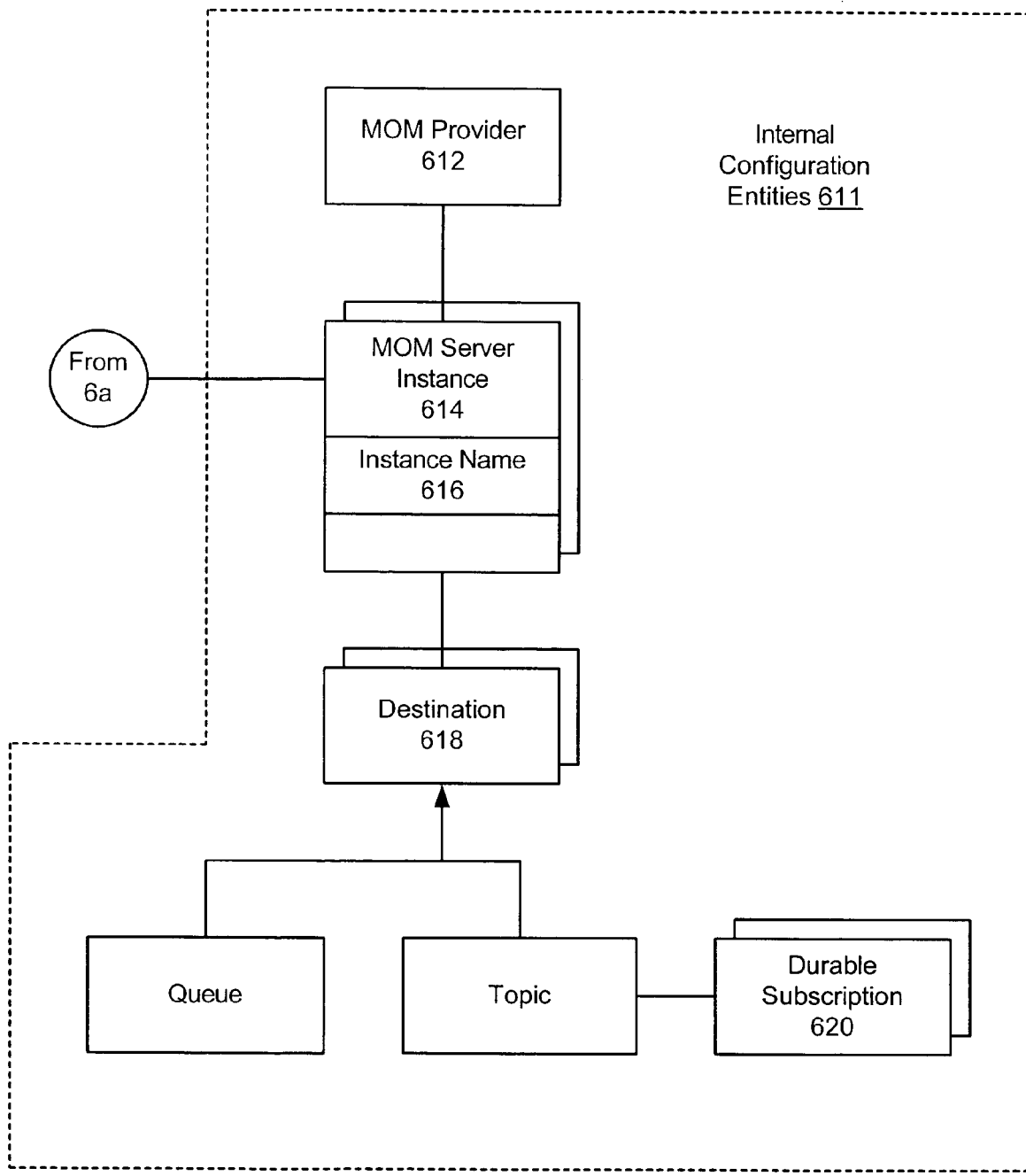
FIG. 6b is a conceptual illustration of the internal configuration entities that define separate MOM server instances, according to an embodiment of the invention.

In an embodiment, internal configuration entities may be used to define logical JMS server instances. FIG. 6a is a conceptual illustration of the administered objects stored in JNDI namespace 600. FIG. 6b is a conceptual illustration of internal configuration entities 611 that define logical JMS server instances, according to an embodiment of the invention.

FIG. 6a is a conceptual illustration of selected elements of the JNDI namespace of a node, according to an embodiment of the invention. One or more administered objects may be bound to JNDI proxy base 602 via, for example, a connector service. JMS connection factory 604 may specify the settings and driver libraries that are used to connect to a JMS provider (e.g., JMS provider 612, shown in FIG. 6b). Enhanced connection factory 606 is a special type of connection factory that allows for settings to be specified that support multiple logical JMS server instances (e.g., supports the configuration of the entities shown in FIG. 6b). Destination administered object 608 may specify the settings for a destination (e.g., for a queue and/or a topic). Enhanced destination object 610 is a special type of destination object that supports settings such as those discussed below with reference to FIG. 9.

FIG. 6b is a conceptual illustration of selected configuration entities, according to an embodiment of the invention. Each configuration entity may include one or more items of configuration information (e.g., an MOM server instance identifier). An MOM provider (e.g., MOM provider 300, shown in FIG. 3) may use this configuration information to determine how to handle (e.g., where to send) incoming and outgoing messages. In addition, the configuration information may specify the use of system resources such as memory.

MOM provider 612 is the central configuration entity for an MOM provider (e.g., MOM provider 300, shown in FIG. 3). In an embodiment, the configuration information (or, for ease of discussion, "properties") stored for MOM provider 612 are valid for all logical MOM server instances of the MOM provider. Typically these values are system-specific (e.g., network port number) and are, therefore established during installation of an enterprise network. In an embodiment, the MOM server instances share these network layer properties.

In an embodiment, an administrative tool (e.g., administrative tool 514, shown in FIG. 5) may be used to modify the configuration information. In one embodiment, a default MOM server instance is initially instantiated during, for example, installation of MOM provider 612. As is further described below, additional MOM server instances may be separately configured on the application server via, for example, an administrative tool (e.g., administrative tool 514, shown in FIG. 5).

As described above, embodiments of the invention provide an MOM provider having multiple logical MOM server instances. In one embodiment, MOM server instance configuration entity 614 provides a mechanism for defining the multiple logical MOM server instances. Each MOM server instance may manage a distinct set of destinations. Thus, a particular queue or topic is typically deployed to one logical MOM server instance.

In an embodiment, all MOM server instances share one common network layer and, therefore, use the same port. For example, all MOM server instances may share the common network layer defined in MOM provider entity 612. In such an embodiment, an MOM server instance is unambiguously identified by the combination of a hostname, port, and MOM server instance name (e.g., server instance name 616 also referred to as a server instance identifier).

In an embodiment, one or more properties may be configured for each MOM server instance. For example, each MOM server instance may have an instanceName (or other identifier) to distinguish one server instance from another. In an embodiment, each instanceName is unique for a given application server installation. In one embodiment, all application servers and all MOM server instances share a common configuration store. In such an embodiment, a configuration store property (e.g., a Uniform Resource Locator (URL)) may be configured for each MOM server instance. A configuration repository (e.g., configuration repository 512, shown in FIG. 5) may access the configuration store using the specified URL (or other specified configuration store property).

In an embodiment, one or more properties may be specified for a destination. Destination entity 618 represents the configurable properties of a destination according to an embodiment of the invention. Typically, queues and topics have a number of common properties which are, hereinafter, referred to as "standard destination properties." In one embodiment, the standard destination properties include: a name and a defaultJNDIName. The "name" may provide a unique internal (e.g., within an application server) identifier for a destination. The "defaultJNDIName" may specify the default name for a destination in a JNDI directory. In one embodiment, the MOM provider automatically creates an administered object in JNDI when a destination having a defaultJNDIName is deployed to the MOM provider. In alternative embodiments, destination entity 618 may have more properties, fewer properties, and/or different properties.

In an embodiment, a client may have a durable subscription to a topic. Durable subscription entity 620 illustrates the configurable properties of a durable subscription. Durable subscription entity 620 may be created during runtime and/or may be "pre-defined" during design time. If durable subscription entity 620 has been pre-defined during design time, a client may call the following method to create a durable subscription: "createDurableSubscriber(topic, subscriptionName)." In response, the MOM provider (e.g., MOM provider 300, shown in FIG. 3) may automatically apply one or more predefined properties to the durable subscription. Alternatively, the properties for a durable subscription may be individually set during runtime.

In one embodiment, the configurable properties of durable subscription entity 620 include a name property and a NoLocal property. The name property may provide an identifier for the durable subscription. The NoLocal property may provide a mechanism for clients to ensure that they are not the recipients of messages that they publish. In alternative embodiments, durable subscription entity 620 may have more properties, fewer properties, and/or different properties.

In an embodiment, a "snapshot" of a reference configuration for an MOM server instance may be generated in, for example, an IDE. The term "snapshot" may refer to an eXtensible Markup Language (XML) description of the reference configuration. The reference configuration may specify configuration parameters to optimize the MOM server instance for a given application. The reference configuration may be included in the archive files of the application (e.g., in the J2EE Enterprise Archive) to specify standard settings for an MOM server instance to be used with the application.

Figure 7:
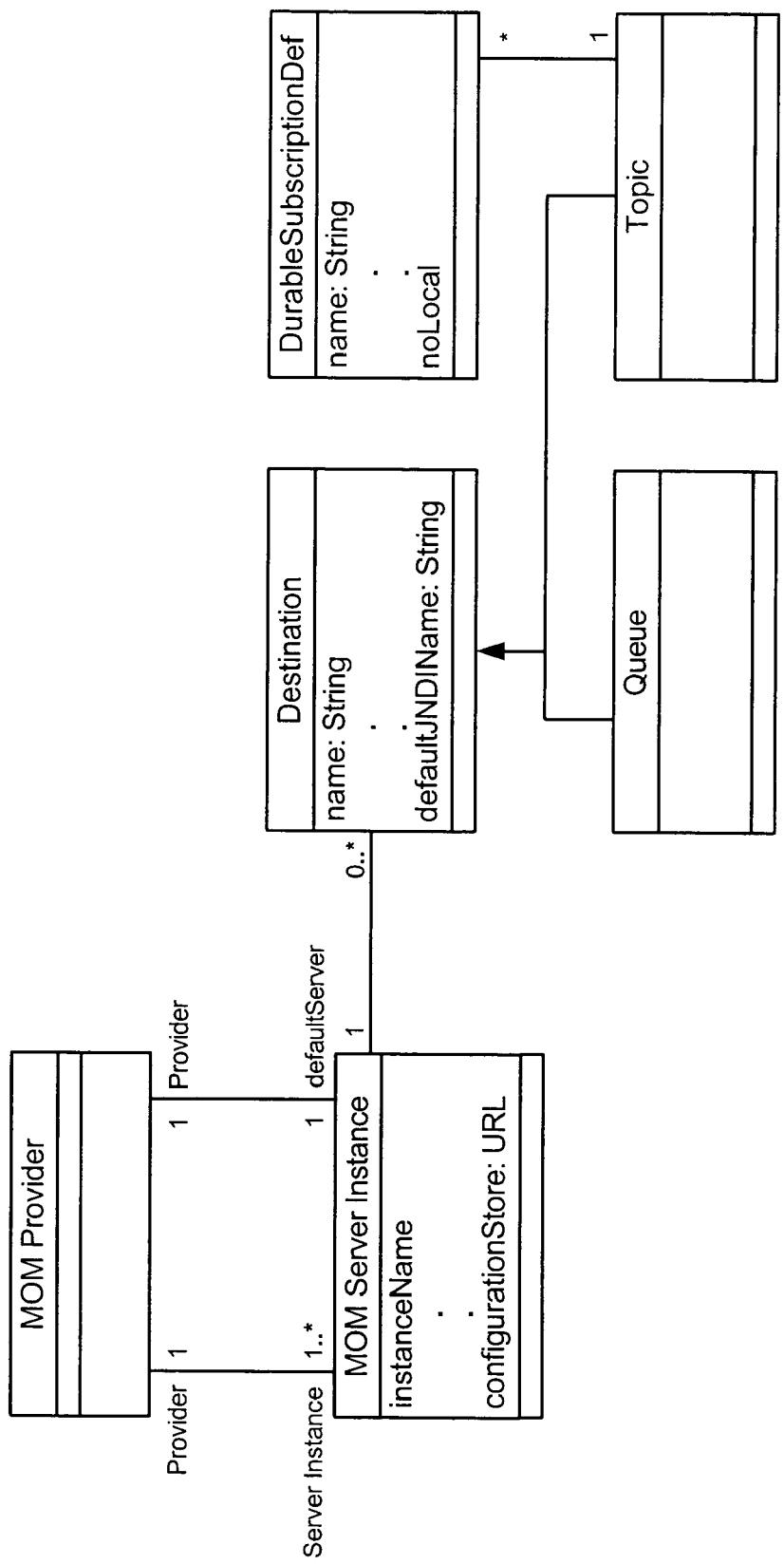
FIG. 7 is a Unified Modeling Language (UML) diagram illustrating the data model described above with reference to tables 1-6.

FIG. 7 is a Unified Modeling Language (UML) diagram illustrating the data model described above with reference to FIG. 6*b*. It is to be understood that the properties illustrated in FIG. 7 (and described above) are the configurable properties in an exemplary embodiment of the invention. In an alternative embodiment, each configuration entity may have more properties, fewer properties, and/or different properties.

Figure 8A:
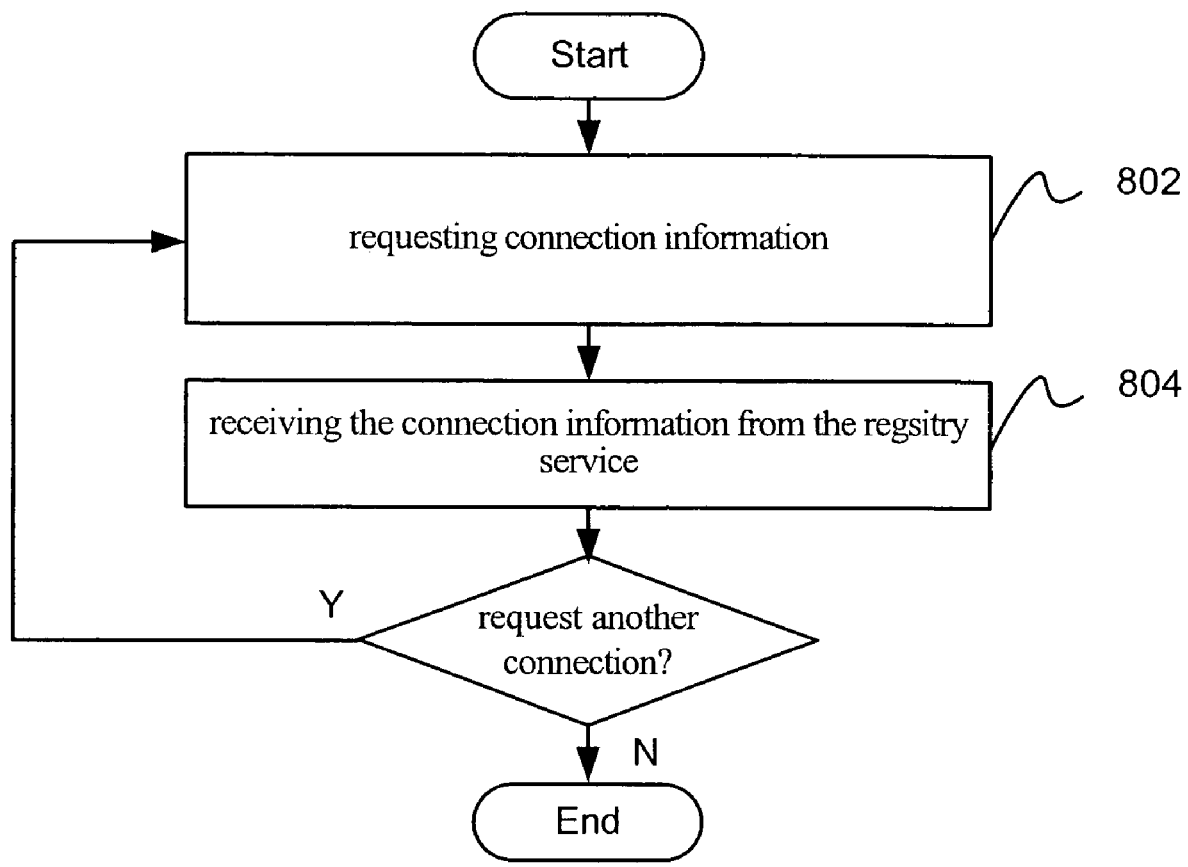
FIG. 8a is a flow diagram illustrating certain aspects of a method for accessing an MOM provider having multiple logical MOM server instances, according to an embodiment of the invention.
Figure 8B:
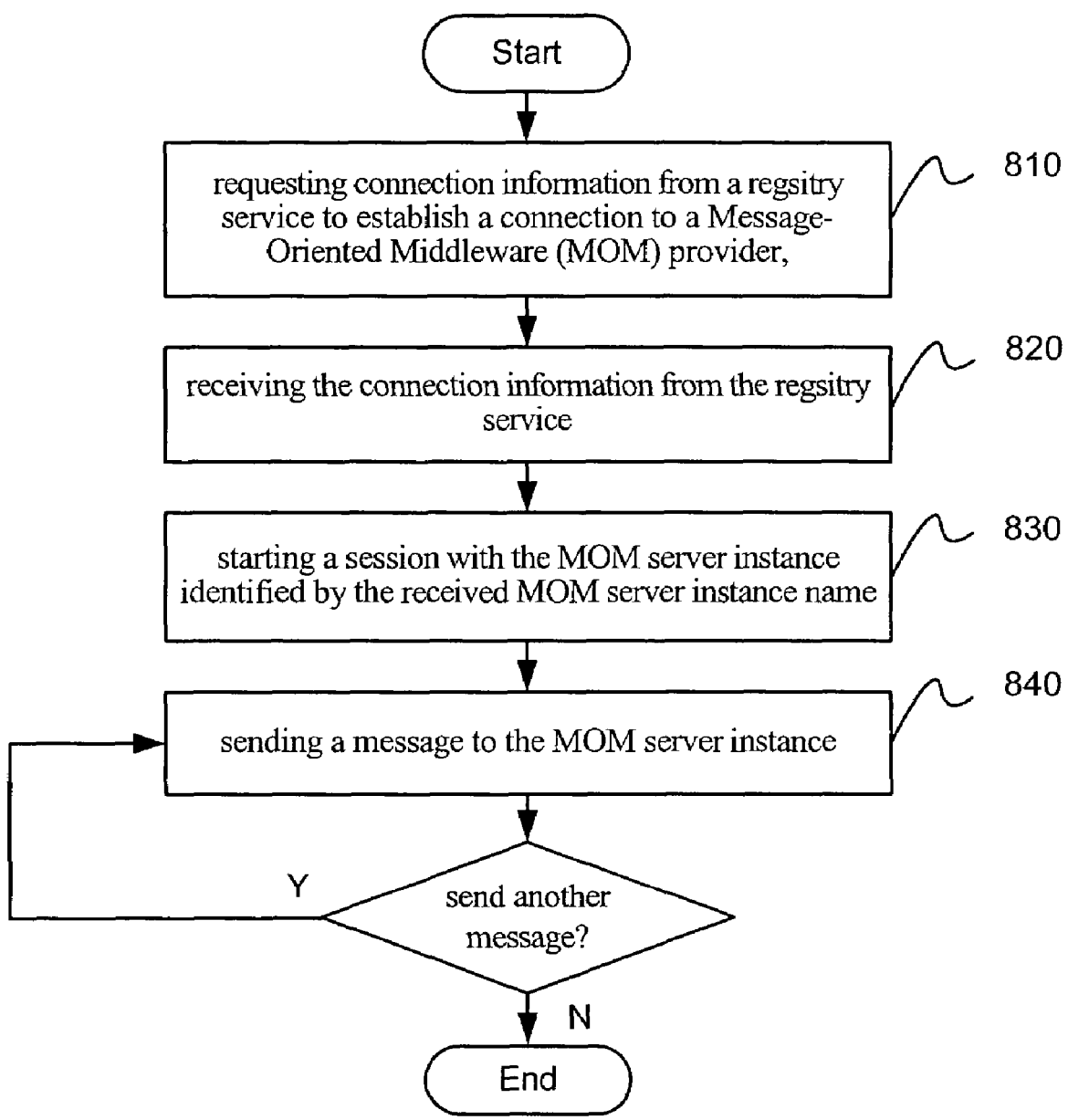
FIG. 8b is a flow diagram illustrating certain aspects of a method for employing an MOM provider having multiple server instances, according to an embodiment of the invention.

Turning now to FIGS. 8*a*-8*b*, the particular methods associated with embodiments of the invention are described in terms of computer software and hardware with reference to a flowchart. The methods to be performed by an MOM provider having multiple MOM server instances may constitute state machines or computer programs made up of computer-executable instructions. The computer-executable instructions may be written in a computer programming language or may be embodied in firmware logic. If written in a programming language conforming to a recognized standard, such instructions can be executed on a variety of hardware platforms and for interface to a variety of operating systems. In addition, embodiments of the invention are not described with reference to any particular programming language. It will be appreciated that a variety of programming languages may be used to implement the teachings of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

FIG. 8*a* is a flow diagram illustrating certain aspects of a method for accessing an MOM provider having multiple logical MOM server instances, according to an embodiment of the invention. Referring to process block 802, an MOM client requests connection information from a registry service to establish a connection to an MOM provider. Referring to process block 804, the MOM client receives the connection information from the registry service. In an embodiment, the received connection information includes one or more MOM parameters including, for example, an MOM server instance name to uniquely identify one of a plurality of MOM server instances.

FIG. 8*b* is a flow diagram illustrating certain aspects of a method for employing an MOM provider having multiple logical MOM server instances, according to an embodiment of the invention. Referring to process block 810, an MOM client (e.g., application 402, shown in FIG. 4) requests connection information from a registry service to establish a connection to an MOM provider (e.g., MOM provider 410, shown in FIG. 4). In one embodiment, the MOM provider is logically distributed into a number of MOM server instances (e.g., MOM server instances 420 and 430). Each of the MOM server instances may separately manage one or more destinations. The term "MOM client" broadly refers to an application and/or component (e.g., service, agent, routine, etc) that sends and/or receives messages.

A "registry service" may be, for example, a "naming service" and/or a "directory service." A "naming service" refers to a service that enables software entities to name objects and to retrieve objects by name. Typically, a "name" is generated by a set of syntactic rules called a naming convention. The association of an object with its name may be referred to as a binding. A "directory service" refers to a naming service that allows each bound object to be associated with attributes and provides a way to retrieve an object based on its attributes rather than its name.

In one embodiment, the registry service may be based, at least in part, on the Java Naming and Directory Interface (JNDI). In such an embodiment, requesting connection information may include requesting a "connection factory object" from the JNDI. A connection factory object may provide the settings and driver libraries that a client uses to connect with the MOM provider. In an embodiment, the connection factory object includes an MOM server instance identifier (e.g., an instanceName) to identify the MOM server instance having the session container to which the client will connect. The term "establishing a connection" refers to using the connection information to reach an MOM server instance.

Figure 9:
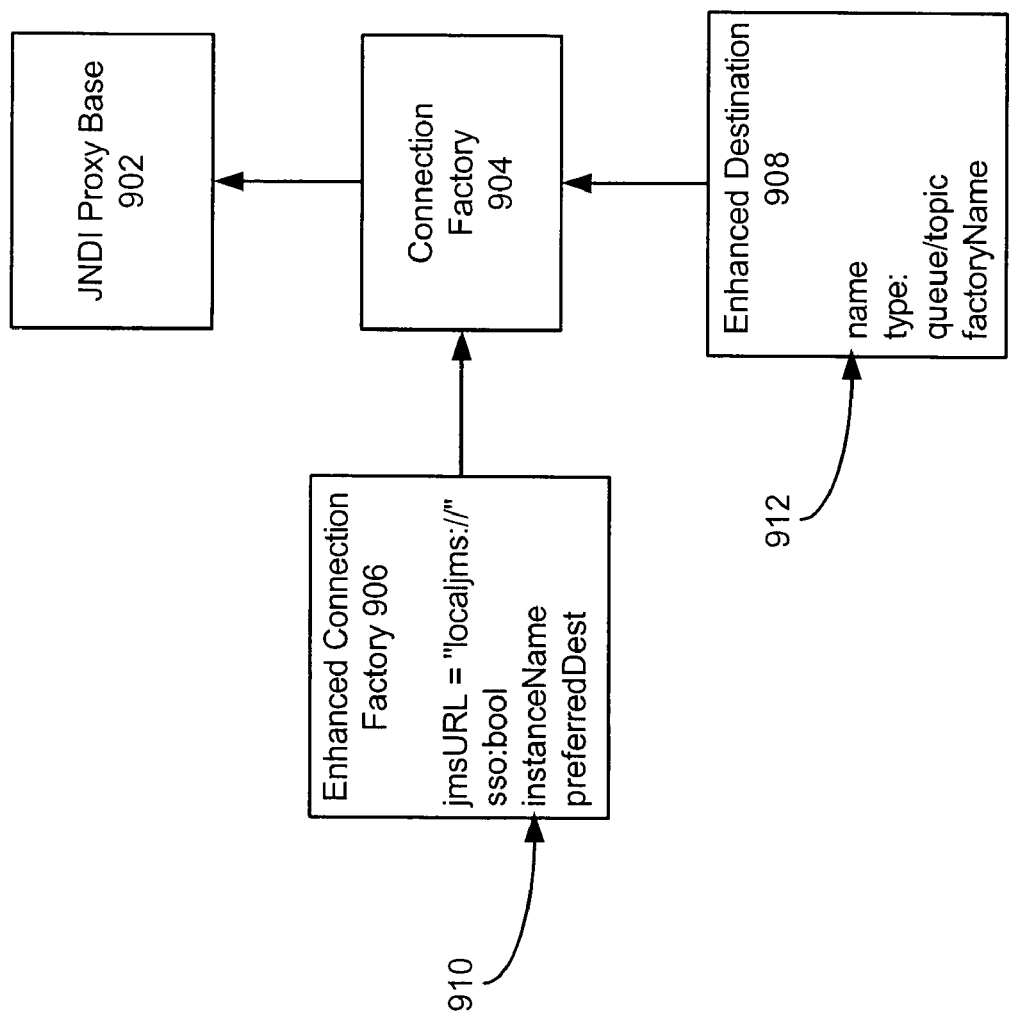
FIG. 9 is a block diagram illustrating objects in a registry service, according to an embodiment of the invention.

FIG. 9 is a block diagram illustrating objects in a registry service, according to an embodiment of the invention. JNDI proxy base 902 and connection factory 904 are substantially similar to JNDI proxy base 602 and JMS connection factory 604 discussed above with reference to FIG. 6. In addition, FIG. 9 illustrates enhanced connection factory 906 and enhanced destination 908.

In an embodiment, enhanced connection factory 906 and enhanced destination 908 include properties (e.g., MOM parameters) that facilitate multiple MOM server instances. For example, enhanced connection factory 906 includes MOM server instance identifier 910 to specify the MOM server instance to which enhanced connection factory 906 provides a connection. Similarly, enhanced destination 908 includes destination identifier 912 to specify (at least locally) the identity of the destination.

Referring again to FIG. 8b, the client receives the connection information from the registry service at process block 820. In an embodiment, the received connection information may include one or more MOM parameters. The MOM parameters may specify system specific information that the client may use to connect to the MOM provider. In one embodiment, the MOM parameters include an MOM server instance identifier (e.g., an instanceName). The MOM server instance identifier may uniquely identify a logical MOM server instance.

Referring to process block 830, the client starts a session with the MOM server instance that is specified by the received MOM server instance identifier. A "session" refers to a context for producing and/or consuming messages. In one embodiment, a session may be either a queue type session or a topic type session depending on the destination of the session. The following is an exemplary code snippet suitable for starting a session in which a topic is the destination: "Topic-Session topicSession=TopicConnection.createTopicSession (param 1, param 2)."

Referring to process block 840, the client sends a message to the MOM server instance specified by the received MOM server instance identifier. In one embodiment, the message includes a globally unique identifier to uniquely identify a destination associated with the MOM server instance. The destination may be, for example, a queue or a topic. In one embodiment, each destination has an associated destination identifier (e.g., a destination name). In an embodiment, the destination identifier may be locally unique. In other words, two destinations on two different MOM server instances may have the same destination identifier. The globally unique identifier may be a combination of the MOM server instance identifier and the destination identifier.

Figure 10:
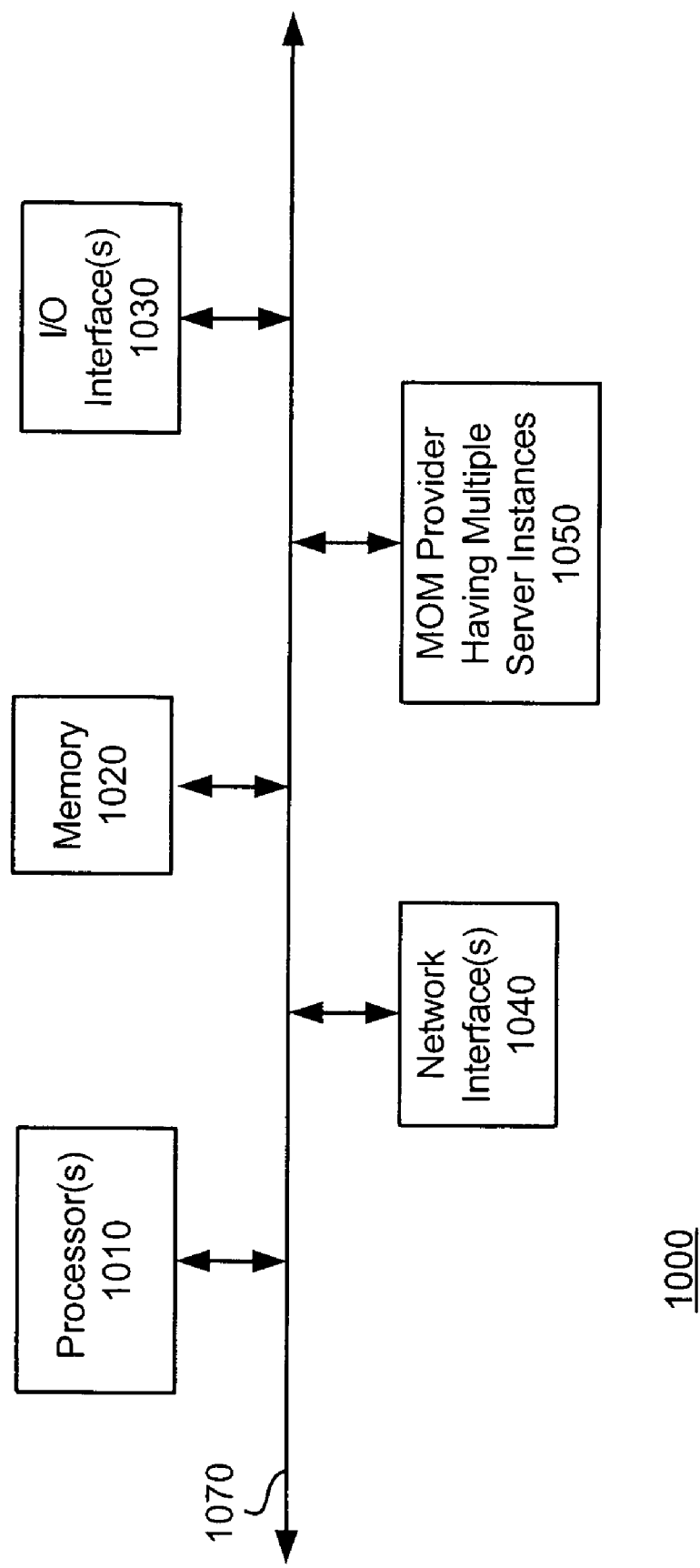
FIG. 10 is a block diagram of a computing device implemented according to an embodiment of the invention.

FIG. 10 is a block diagram of computing device 1000 implemented according to an embodiment of the invention. Computing device 1000 may include: processor(s) 1010, memory 1020, one or more Input/Output interfaces 1030, network interface(s) 1040, and MOM provider having multiple server instances 1050. The illustrated elements may be connected together through system interconnection 1070. Processor(s) 1010 may include a microprocessor, microcontroller, field programmable gate array (FPGA), application specific integrated circuit (ASIC), central processing unit (CPU), programmable logic device (PLD), and similar devices that access instructions from system storage (e.g., memory 1020), decode them, and execute those instructions by performing arithmetic and logical operations.

MOM provider having multiple server instances 1050 enables computing device 1000 to provide a scalable MOM provider for an enterprise network. MOM provider having multiple server instances 1050 may be executable content, control logic (e.g., ASIC, PLD, FPGA, etc.), firmware, or some combination thereof, in an embodiment of the invention. In embodiments of the invention in which MOM provider having multiple server instances 1050 is executable content, it may be stored in memory 1020 and executed by processor(s) 1010.

Memory 1020 may encompass a wide variety of memory devices including read-only memory (ROM), erasable programmable read-only memory (EPROM), electrically erasable programmable read-only memory (EEPROM), random access memory (RAM), non-volatile random access memory (NVRAM), cache memory, flash memory, and other memory devices. Memory 1020 may also include one or more hard disks, floppy disks, ZIP disks, compact disks (e.g., CD-ROM), digital versatile/video disks (DVD), magnetic random access memory (MRAM) devices, and other system-readable media that store instructions and/or data. Memory 1020 may store program modules such as routines, programs, objects, images, data structures, program data, and other program modules that perform particular tasks or implement particular abstract data types that facilitate system use.

One or more I/O interfaces 1030 may include a hard disk drive interface, a magnetic disk drive interface, an optical drive interface, a parallel port, serial controller or super I/O controller, serial port, universal serial bus (USB) port, a display device interface (e.g., video adapter), a network interface card (NIC), a sound card, modem, and the like. System interconnection 1070 permits communication between the various elements of computing device 1000. System interconnection 1070 may include a wide variety of signal lines including one or more of a memory bus, peripheral bus, local bus, host bus, bridge, optical, electrical, acoustical, and other propagated signal lines.

Elements of the present invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, propagation media or other type of machine-readable media suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A Message Oriented Middleware (MOM) provider apparatus comprising:
   an application server comprising a processor and a memory;
   a first logical MOM server instance, identified by a first MOM server instance identifier, to provide a MOM service to a first client; and
   a second logical MOM server instance, identified by a second MOM server instance identifier different than the first MOM server instance identifier, to provide a MOM service to a second client; the first logical MOM server instance and the second logical MOM server instance are implemented on the application server; and
   each of the first logical MOM server instance and the second logical MOM server instance comprising:
   a session container to manage one or more message sessions; and
   a destination container having a destination identified by a destination identifier, wherein the destination of each logical MOM server instance is associated with a globally unique destination identifier comprising a combination of the destination identifier and one of the first MOM server instance identifier or the second MOM server instance identifier.

2. The MOM provider apparatus of claim 1, wherein the first logical MOM server instance is defined by a first configuration entity and the second logical MOM server instance is defined by a second configuration entity.

3. The MOM provider apparatus of claim 2, wherein the first configuration entity specifies a MOM server instance identifier to identify the first logical MOM server instance.

4. The MOM provider apparatus of claim 1, wherein destination identifiers of the first client and the second client are differentiated by only the MOM server instance identifier.

5. The MOM provider apparatus of claim 3, wherein the MOM provider is a Java Message Service provider.

6. The MOM provider apparatus of claim 1, wherein the first logical MOM server instance comprises:
   a destination container having one or more destinations, each destination having a globally unique identifier.

7. The MOM provider apparatus of claim 1, wherein the first logical MOM server instance and the second logical MOM server instance share at least one network layer property.

8. The MOM provider apparatus of claim 1, wherein the MOM provider operates on the same application server with the first logical MOM server instance and the second logical MOM server instance.

9. The MOM provider apparatus of claim 1, wherein each session container comprises:
   an inbound bus having one or more logical handlers to process an incoming message; and
   an outbound bus to pass an outgoing message to a dispatcher for distribution to a MOM client.

10. The MOM provider apparatus of claim 1, wherein:
    the destination identifier is unique within each destination container but ambiguous between the destination containers.

11. The MOM provider apparatus of claim 10, wherein each destination comprises
    one of:
    a queue, and
    a topic.

12. The MOM provider apparatus of claim 1, wherein each of the first logical MOM server instance and the second logical MOM server instance operate on a common network layer.

13. The MOM provider apparatus of claim 1, wherein the MOM provider is a Java Message Service based MOM provider.

14. The MOM provider apparatus of claim 1, wherein the application server comprises a Java 2, Enterprise Edition (J2EE) compatible application server.

* * * * *

UNITED STATES PATENT AND TRADEMARK OFFICE
CERTIFICATE OF CORRECTION

PATENT NO. : 7,634,550 B2  Page 1 of 1
APPLICATION NO. : 10/829875
DATED : December 15, 2009
INVENTOR(S) : Wolber et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1609 days.

Signed and Sealed this

Twenty-first Day of December, 2010

David J. Kappos
*Director of the United States Patent and Trademark Office*